United States Patent
Suga (10) Patent No.: US 10,686,973 B2
(45) Date of Patent: Jun. 16, 2020

(54) IMAGE PICKUP APPARATUS WITH TWO OPTICAL SYSTEMS

(71) Applicant: OLYMPUS CORPORATION, Hachioji-shi, Tokyo (JP)

(72) Inventor: Takeshi Suga, Hino (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 16/004,116

(22) Filed: Jun. 8, 2018

(65) Prior Publication Data
US 2018/0295265 A1 Oct. 11, 2018

Related U.S. Application Data

(63) Continuation of application No. PCT/JP2016/082118, filed on Oct. 28, 2016.

(30) Foreign Application Priority Data

Dec. 14, 2015 (JP) ................................. 2015-243234

(51) Int. Cl.
*H04N 5/225* (2006.01)
*H04N 13/207* (2018.01)
(Continued)

(52) U.S. Cl.
CPC ........... *H04N 5/2254* (2013.01); *G02B 7/021* (2013.01); *G02B 7/06* (2013.01); *G02B 7/10* (2013.01);
(Continued)

(58) Field of Classification Search
CPC .. H04N 5/2254; H04N 13/207; H04N 5/2253; H04N 5/23212; H04N 2213/001; G02B 7/021; G02B 7/10
(Continued)

(56) References Cited

U.S. PATENT DOCUMENTS 4,754,327 A * 6/1988 Lippert .................. G03B 35/16
348/50
5,548,362 A * 8/1996 Wah Lo ................. G03B 35/10
396/326
(Continued)

FOREIGN PATENT DOCUMENTS

EP 2919067 A1 9/2015
JP H07294827 A 11/1995
(Continued)

OTHER PUBLICATIONS

International Preliminary Report on Patentability (IPRP) (and an English language translation thereof) dated Jun. 19, 2018 issued in counterpart International Application No. PCT/JP2016/082118.
(Continued)

*Primary Examiner* — Zaihan Jiang
(74) *Attorney, Agent, or Firm* — Holtz, Holtz & Volek PC (57) ABSTRACT

An image pickup apparatus, includes a first optical system and a second optical system which generate two optical images having mutual parallax; and one image sensor which captures the two optical images, wherein each of the first optical system and the second optical system has a different focusing unit, further includes a first frame which holds some of lenses in the first optical system, a second frame which holds the image sensor; and a third frame which holds lenses in the first optical system other than the lenses held by the first frame, and lenses in the second optical system, wherein the first frame is movable in a direction of optical axes with respect to the third frame, and the second frame is movable in a direction of optical axes with respect to the third frame.

1 Claim, 5 Drawing Sheets

(51) Int. Cl.
*H04N 5/232* (2006.01)
*G02B 7/02* (2006.01)
*G02B 7/10* (2006.01)
*G02B 7/06* (2006.01)
*G03B 35/10* (2006.01)
*G03B 3/00* (2006.01)
*H04N 13/296* (2018.01)
*H04N 13/218* (2018.01)

(52) U.S. Cl.
CPC ............ *G03B 3/00* (2013.01); *G03B 35/10* (2013.01); *H04N 5/2253* (2013.01); *H04N 5/23212* (2013.01); *H04N 13/207* (2018.05); *H04N 13/218* (2018.05); *H04N 13/296* (2018.05); *H04N 2213/001* (2013.01)

(58) Field of Classification Search
USPC .......................................................... 348/49
See application file for complete search history.

(56) References Cited

U.S. PATENT DOCUMENTS

| | | | |
|---|---|---|---|
| 5,933,282 A | 8/1999 | Tomioka et al. | |
| 6,512,892 B1* | 1/2003 | Montgomery | H04N 13/279 396/326 |
| 2006/0187323 A1 | 8/2006 | Kobayashi et al. | |
| 2011/0188136 A1* | 8/2011 | Lo | G02B 7/04 359/823 |
| 2011/0200319 A1* | 8/2011 | Kravitz | G03B 17/02 396/333 |
| 2013/0010084 A1* | 1/2013 | Hatano | G03B 35/08 348/47 |
| 2013/0021684 A1 | 1/2013 | Miyamoto et al. | |
| 2013/0033572 A1* | 2/2013 | Wernersson | H04N 13/128 348/46 |
| 2013/0170029 A1 | 7/2013 | Morita et al. | |
| 2014/0168383 A1* | 6/2014 | Murakami | G02B 7/36 348/47 |
| 2014/0176686 A1* | 6/2014 | Wakabayashi | H04N 13/296 348/51 |
| 2014/0177043 A1 | 6/2014 | Togino et al. | |
| 2015/0256812 A1* | 9/2015 | Yamazaki | H04N 13/218 348/49 |
| 2015/0271483 A1* | 9/2015 | Sun | H04N 17/002 348/187 |
| 2016/0320606 A1 | 11/2016 | Togino | |
| 2017/0026634 A1* | 1/2017 | Mirlay | H04N 13/289 |
| 2018/0101090 A1* | 4/2018 | Lablans | G03B 35/00 |

FOREIGN PATENT DOCUMENTS

| | | |
|---|---|---|
| JP | H08307906 A | 11/1996 |
| JP | H09325273 A | 12/1997 |
| JP | 2007004122 A | 1/2007 |
| JP | 2012194352 A | 10/2012 |
| JP | 5427323 B2 | 2/2014 |
| JP | 2014160240 A | 9/2014 |
| JP | 2014215336 A | 11/2014 |
| WO | 2012056653 A1 | 5/2012 |

OTHER PUBLICATIONS

Extended European Search Report (EESR) dated Jul. 10, 2019 issued in counterpart European Application No. 16875261.6.
International Search Report (ISR) dated Jan. 31, 2017 issued in International Application No. PCT/JP2016/082118.
Written Opinion dated Jan. 31, 2017 issued in International Application No. PCT/JP2016/082118.
Japanese Office Action dated Oct. 20, 2017 issued in counterpart Japanese Application No. 2017-539036.
Chinese Office Action dated Mar. 4, 2020 (and English translation thereof) issued in counterpart Chinese Application No. 201680073232.7.

* cited by examiner

IMAGE PICKUP APPARATUS WITH TWO OPTICAL SYSTEMS

CROSS-REFERENCE TO RELATED APPLICATION

The present application is a continuation application of PCT/JP2016/082118 filed on Oct. 28, 2016 which is based upon and claims the benefit of priority from Japanese Patent Application No. 2015-243234 filed on Dec. 14, 2015; the entire contents of which are incorporated herein by reference.

BACKGROUND OF THE INVENTION

Field of the Invention

The present invention relates to an image pickup apparatus.

Description of the Related Art

A stereoscopic observation system has heretofore been known. The stereoscopic observation system uses a method of capturing two images having a different parallax for stereoscopic vision, by forming the two images on substantially same plane, such as an image pickup surface of the one image sensor (refer to Japanese Patent Publication No. 5427323, Japanese Patent Application Laid-open Publication No. 2014-160240, and Japanese Patent Application Laid-open Publication No. 2014-215336 for example). Moreover, in an arrangement according to a conventional technology, two different optical systems are used for achieving two images having a different parallax.

SUMMARY OF THE INVENTION

An image pickup apparatus according to at least some embodiments of the present invention includes a first optical system and a second optical system which generate two optical images having mutual parallax; and one image sensor which captures the two optical images, wherein each of the first optical system and the second optical system has a different focusing unit, further includes a first frame which holds some of lenses in the first optical system, a second frame which holds the image sensor; and a third frame which holds lenses in the first optical system other than the lenses held by the first frame, and all lenses in the second optical system, wherein the first frame is movable in a direction of optical axes with respect to the third frame, and the second frame is movable in a direction of optical axes with respect to the third frame.

DETAILED DESCRIPTION OF THE INVENTION

An image pickup apparatus according to an embodiment will be described below in detail by referring to the accompanying diagrams. However, the present invention is not restricted to the embodiment described below.

Figure 1A:
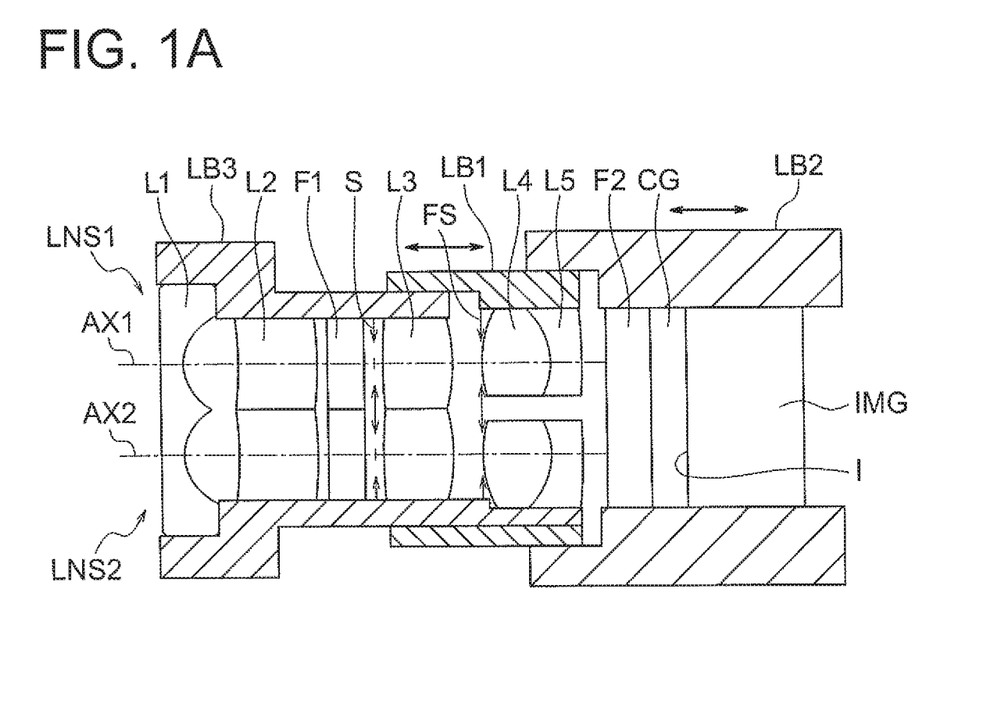
FIG. 1A is a diagram showing a schematic arrangement of an image pickup apparatus according to an embodiment.

FIG. 1A is a diagram showing a schematic arrangement of an image pickup apparatus according to the present embodiment.

The image pickup apparatus according to the present embodiment includes a first optical system LNS1 and a second optical system LNS2 which generate two optical images having a mutual parallax, and one image sensor IMG which captures the two optical images, wherein the first optical system LNS1 and the second optical system. LNS2 have a first frame LB1, a second frame LB2, and a third frame LB3 which are different focusing units.

For instance, the first optical system LNS1 forms an image for the right eye, and the second optical system LNS2 forms an image for the left eye.

Accordingly, it is possible to adjust a difference in focusing positions of the first optical system LNS1 and the second optical system LNS2, and to achieve favorable parallax images.

Moreover, according to a preferable aspect of the present invention, it is desirable that the image pickup apparatus includes a first frame LB1 which holds lenses L4 and L5 in the first optical system LNS1, a second frame LB2 which holds the image sensor IMG, and a third frame LB3 which holds lenses L1, L2, F1 (plane parallel plate), and L3 other than the lenses L4 and L5 in the first optical system LNS1, and lenses L1, L2, F1 (plane parallel plate), L3, L4, and L5 in the second optical system LNS2, and the first frame LB1 is movable in a direction of optical axes AX1 and AX2 with respect to the third frame, and the second frame LB2 is movable in the direction of optical axis AX1 and AX2 with respect to the third frame LB3, via the first frame LB1.

In the arrangement described above, by moving the first frame LB1 in the direction of the optical axes AX1 and AX2 with respect to the third frame LB3, it is possible to move only the lenses L4 and L5 in the first optical system LNS1. Accordingly, it is possible to adjust the focusing position of the first optical system LNS1.

Moreover, a plane parallel plate F2, a plane parallel plate (cover glass) CG, and the image sensor IMG are cemented. The second frame LB2 holds the plane parallel plate F2, the plane parallel plate CG, and the image sensor IMG that are cemented. Moreover, by moving the second frame LB2 in the direction of the optical axes AX1 and AX2 with respect to the third frame LB3, it is possible to adjust the focus of whole of the first optical system LNS1 and the second optical system LNS2.

Thus, according to the present embodiment, it is possible to adjust the difference in focus of the first optical system LNS1 and the second optical system LNS2. Therefore, even when there arises a difference in focus due to an error at the time of manufacturing, it is possible to adjust the focus difference easily. As a result, it is possible to achieve a stereoscopic-vision image based on favorable left and right parallax images.

Moreover, according to a preferable aspect of the present embodiment, it is desirable to satisfy the following conditional expression (1).

$$3 < f2/f1 < 12 \quad (1)$$

where, f1 denotes a focal length of the overall first optical system, and f2 denotes a focal length of the lenses L4 and L5 held by the first frame.

When a value falls below a lower limit value of conditional expression (1) a power of the lenses L4 and L5 for the focusing adjustment becomes strong. Consequently, there arises a need of highly accurate focusing adjustment, and a degradation of a peripheral resolution due to decentering of lenses at the time of adjusting. As a result, it creates a problem in manufacturability of the image pickup apparatus.

When an upper limit value of conditional expression (1) is exceeded, although an accuracy of focusing adjustment is lowered, there arises a need for making a focusing-adjustment width large. Consequently, it is necessary to make large an air space on an object side and an air space on an image side of the lenses L4 and L5 that move. Accordingly, since an overall length of an optical system becomes long, a light-ray height at a lens surface becomes high. For achieving a favorable stereoscopic-vision image, the left and right parallax, or in other words, a distance of about 1.1 mm between the optical axis AX1 and the optical axis AX2, is preferable. As the light-ray height at the lens surface becomes high, since the distance between the optical axis AX1 and the optical axis AX2 has to be made large, securing 1.1 mm parallax becomes difficult.

Figure 1B:
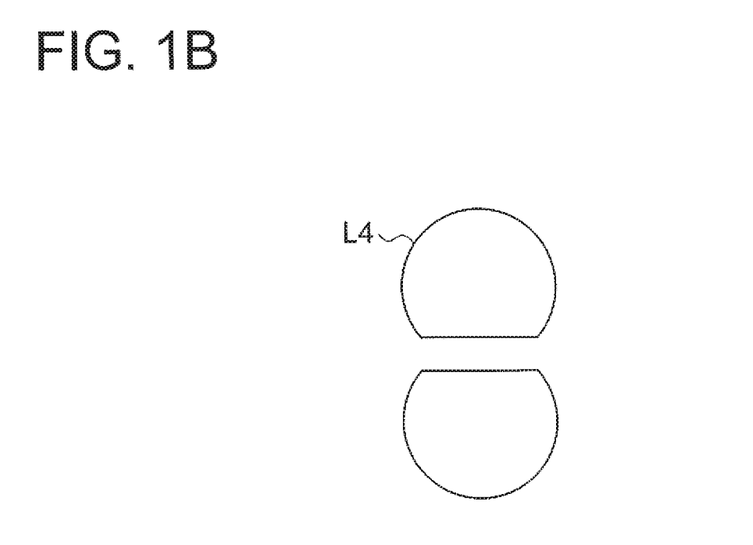
FIG. 1B is a diagram showing a front view of an arrangement of some of lenses in the image pickup apparatus according to the present embodiment.

Moreover, in the present embodiment, it is preferable that a shape of at least some of the lenses is a so-called D-cut shape in which a part of a circumference of a circle is cut off linearly. FIG. 1B is a diagram showing an arrangement in which the lenses L4 and L5 are seen from the direction of the optical axes AX1 and AX2.

The linearly cut portions of the two lenses are disposed to be facing. Accordingly, it is possible to make small the distance between the two optical axes AX1 and AX2. As a result, it is possible to secure an appropriate parallax amount.

Moreover, an aperture stop S is disposed between the plane parallel plate F1 and the lens L3. Furthermore, a flare aperture FS is disposed to be in close vicinity of an object-side surface of a cemented lens of the lens L4 and the lens L5. An aperture shape of the flare aperture FS is a D-cut shape. Accordingly, it is possible to prevent flare by not letting unnecessary light rays to be incident on a D-cut surface of the cemented lens.

It is more preferable to satisfy the following conditional expression (1') instead of conditional expression (1).

$$5 < f2/f1 < 11 \quad (1')$$

Moreover, according to a preferable aspect of the present invention, it is desirable that the lens L1 is formed of one optical member having two concave shapes.

Accordingly, it is possible to fix the lens L1 nearest to object in the first optical system LNS1 and the second optical system LNS2 with a simple arrangement.

EXAMPLE 1

An image pickup apparatus according to an example 1 will be described below.

Figure 2A:
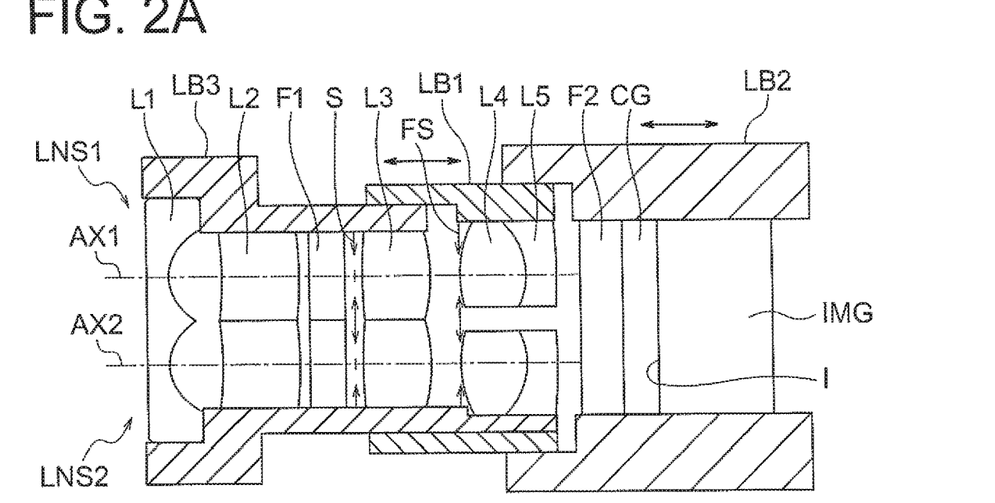
FIG. 2A is a diagram showing a schematic arrangement of an image pickup apparatus according to an example 1.
Figure 2B:
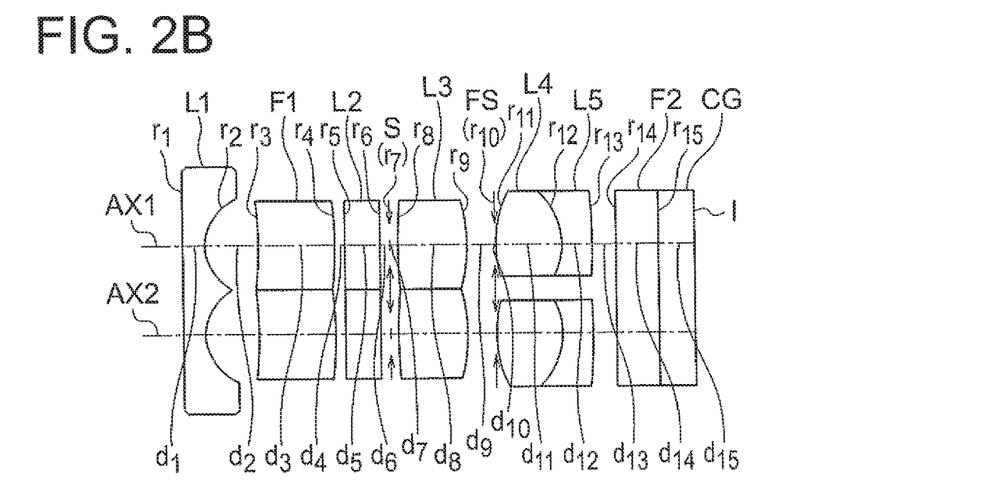
FIG. 2B is a diagram showing a cross-sectional view of a lens arrangement of the image pickup apparatus according to the example 1.

FIG. 2A is a diagram showing a schematic arrangement of the image pickup apparatus according to the present example. FIG. 2B is a diagram showing a cross-sectional view of a lens arrangement of the image pickup apparatus according to the present example.

The image pickup apparatus according to the present embodiment includes a first optical system LNS1 and a second optical system LNS2 which generate two optical images having a mutual parallax. Each of the first optical system LNS1 and the second optical system LNS2 includes in order from an object side, a planoconcave negative lens having a concave surface directed toward an image side, a positive meniscus lens L2 having a convex surface directed toward the image side, a plane parallel plate F1, an aperture stop S, a biconvex positive lens L3, a flare aperture FS, a biconvex positive lens L4, a negative meniscus lens L5 having a convex surface directed toward the image side, a plane parallel plate F2, a plane parallel plate CG, and an image sensor IMG.

The first lens L1 is an integrated member with respect to the first optical system LNS1 (such as a subordinate optical system) and the second optical system LNS2 (such as a main optical system). The positive lens L4 and the negative meniscus lens L5 are cemented. The plane parallel plate F2, the plane parallel plate CG, and the image sensor IMG are cemented.

A lens arrangement of the first optical system LNS1 and a lens arrangement of the second optical system LNS2 are the same. However, in the first optical system. LNS1, the positive lens L4 and the negative meniscus lens L5 are let to be movable.

A first frame LB1 holds the lenses L4 and L5 in the first optical system LNS1. A second frame LB2 holds the plane parallel plate F2, the plane parallel plate CG, and the image sensor IMG. A third frame LB3 holds the lenses other than the lenses L4 and L5 in the first optical system LNS1, which are the lenses L1, L2, F1 (plane parallel plate), and L3, the lenses L1, L2, F1 (plane parallel plate), L3, L4, and L5 in the second optical system LNS2. Moreover, the first frame LB1 is arranged to be movable in a direction of optical axes AX1 and AX2 with respect to the third frame LB3. The second frame LB2 is arranged to be movable in the direction of the optical axes AX1 and AX2 with respect to the third frame LB3, via the first frame LB1.

Figure 2C:
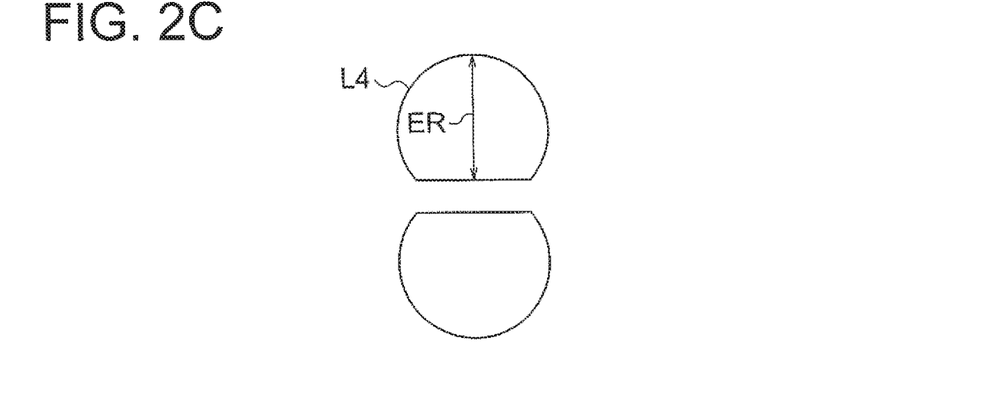
FIG. 2C is a diagram showing a front view of an arrangement of some of the lenses in the image pickup apparatus according to the example 1.

Moreover, as shown in FIG. 2C, the lenses L4 and L5, and the flare aperture FS have a D-cut shape.

EXAMPLE 2

An image pickup apparatus according to an example 2 will be described below.

Figure 3A:
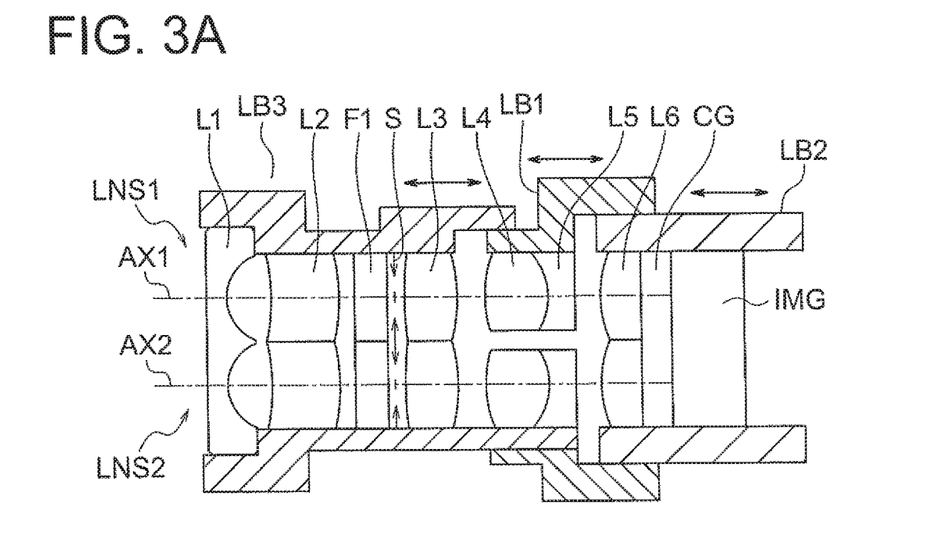
FIG. 3A is a diagram showing a schematic arrangement of an image pickup apparatus according to an example 2.
Figure 3B:
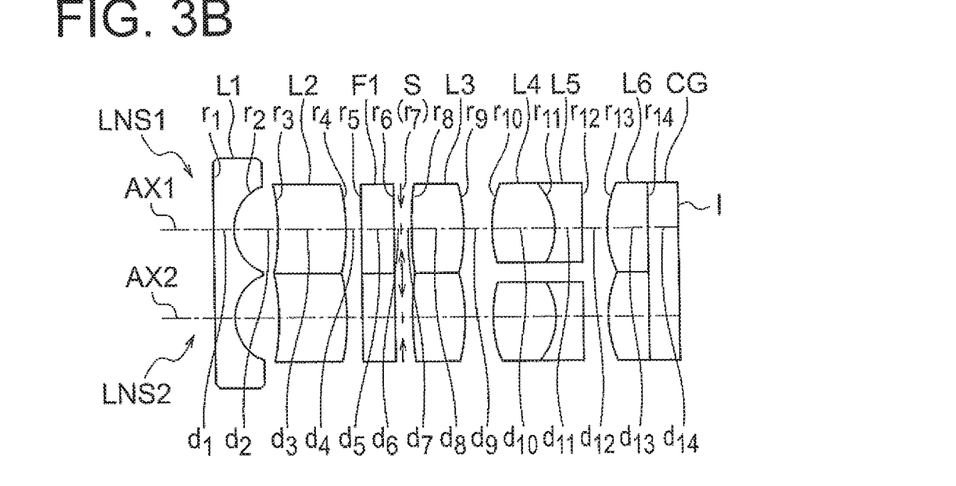
FIG. 3B is a diagram showing a cross-sectional view of a lens arrangement of the image pickup apparatus according to the example 2.

FIG. 3A is a diagram showing a schematic arrangement of the image pickup apparatus according to the present example. FIG. 3B is a diagram showing a cross-sectional view of a lens arrangement of the image pickup apparatus according to the present example.

The image pickup apparatus according to the present embodiment includes a first optical system LNS1 and a second optical system LNS2 which generate two optical images having a mutual parallax. Each of the first optical system LNS1 and the second optical system LNS2 includes in order from an object side, a planoconcave negative lens L1 having a concave surface directed toward an image side, a negative meniscus lens L2 having a convex surface directed toward the image side, a plane parallel plate F1, an aperture stop S, a biconvex positive lens L3, a biconvex positive lens L4, a negative meniscus lens L5 having a convex surface directed toward the image side, a planoconvex positive lens L6 having a convex surface directed toward the object side, a plane parallel plate CG, and an image sensor IMG.

The planoconvex positive lens L6 is a field lens. Accordingly, it is possible to lower the accuracy of focusing adjustment.

The first lens L1 is an integrated member with respect to the first optical system LNS1 and the second optical system LNS2. The positive lens L4 and the negative meniscus lens L5 are cemented. The planoconvex positive lens L6, the plane parallel plate CG, and the image sensor IMG are cemented.

A lens arrangement of the first optical system LNS1 and a lens arrangement of the second optical system LNS2 are the same. However, in the first optical system. LNS1, the positive lens L4 and the negative meniscus lens L5 are let to be movable.

A first frame LB1 holds the lenses L4 and L5 in the first optical system LNS1. A second frame LB2 holds the lens L6, the plane parallel plate CG, and the image sensor IMG. A third frame LB3 holds the lenses other than the lenses L4 and L5 in the first optical system LNS1, which are the lenses L1, L2, F1 (plane parallel plate), and L3, and the lenses L1, L2, F1 (plane parallel plate), L3, L4, and L5 in the second optical system LNS2. Moreover, the first frame LB1 is arranged to be movable in a direction of optical axes AX1 and AX2 with respect to the third frame LB3. The second frame LB2 is arranged to be movable in the direction of the optical axes AX1 and AX2 with respect to the third frame LB3, via the first frame LB1.

Figure 3C:
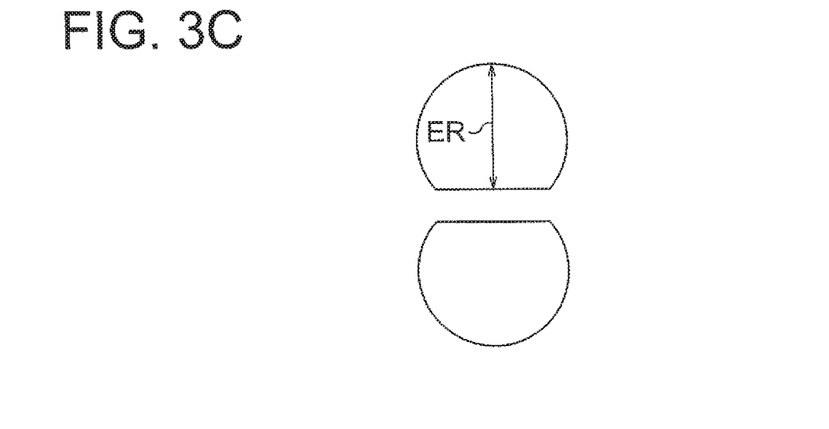
FIG. 3C is a diagram showing a front view of an arrangement of some of the lenses in the image pickup apparatus according to the example 2.

Moreover, as shown in FIG. 3C, the lenses L4 and L5 have a D-cut shape.

EXAMPLE 3

An image pickup apparatus according to an example 3 will be described below.

Figure 4A:
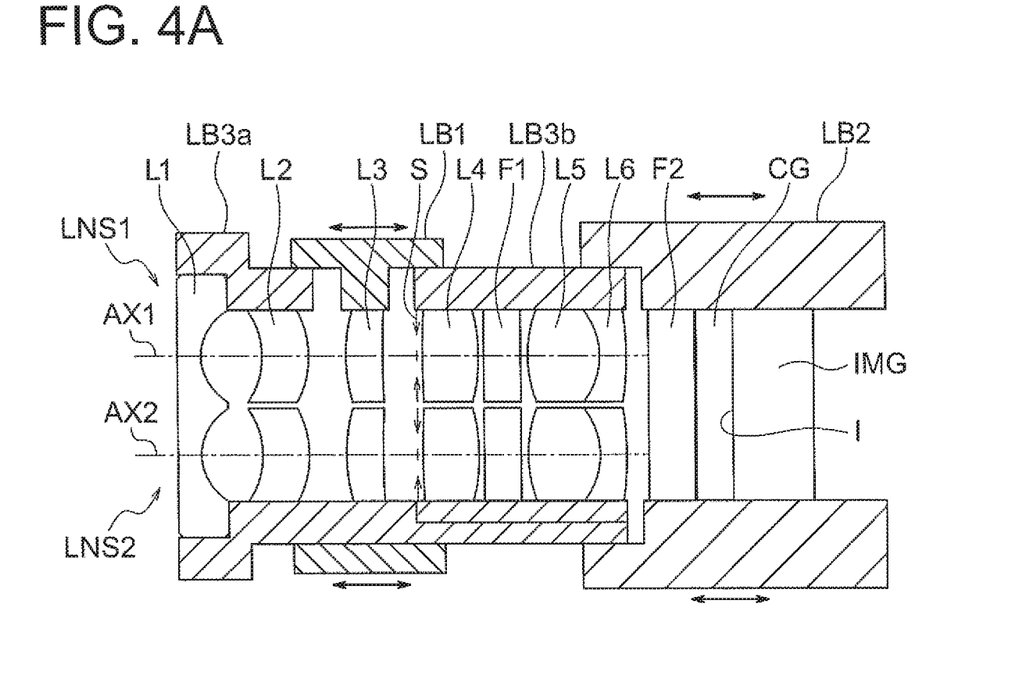
FIG. 4A is a diagram showing a schematic arrangement of an image pickup apparatus according to an example 3.
Figure 4B:
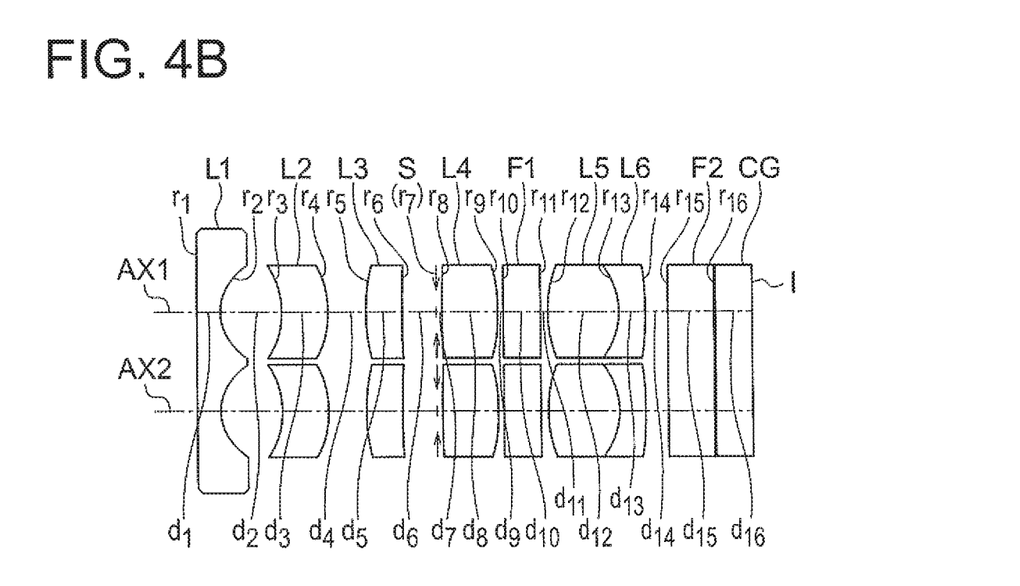
FIG. 4B is a diagram showing a cross-sectional view of a lens arrangement of the image pickup apparatus according to the example 3.

FIG. 4A is a diagram showing a schematic arrangement of the image pickup apparatus according to the present example. FIG. 4B is a diagram showing a cross-sectional view of a lens arrangement of the image pickup apparatus according to the present example.

The image pickup apparatus according to the present embodiment includes a first optical system LNS1 and a second optical system LNS2 which generate two optical images having a mutual parallax. Each of the first optical system LNS1 and the second optical system LNS2 includes in order from an object side, a planoconcave negative lens L1 having a concave surface directed toward an image side, a negative meniscus lens L2 having a convex surface directed toward the image side, a positive meniscus lens L3 having a convex surface directed toward the object side, an aperture stop S, a biconvex positive lens L4, a plane parallel plate F1, a biconvex positive lens L5, a negative meniscus lens L6 having a convex surface directed toward the image side, a plane parallel plate F2, a plane parallel plate CG, and an image sensor IMG.

The first lens L1 is an integrated member with respect to the first optical system LNS1 and the second optical system LNS2. The positive lens L5 and the negative meniscus lens L6 are cemented. The plane parallel plate F2, the plane parallel plate CG, and the image sensor IMG are cemented.

A lens arrangement of the first optical system LNS1 and a lens arrangement of the second optical system LNS2 are the same. However, in the first optical system. LNS1, the positive meniscus lens L3 is let to be movable.

A first frame LB1 holds the lens L3 in the first optical system LNS1. A second frame LB2 holds the plane parallel plate F2, the plane parallel plate CG, and the image sensor IMG. Third frames LB3a and LB3b hold lenses other than the lens L3 in the first optical system LNS1, which are the lenses L1, L2, L4, F1 (plane parallel plate), L5, and L6, and the lenses L1, L2, L3, L4, F1 (plane parallel plate), L5, and L6 in the second optical system LNS2. Moreover, the first frame LB1 is arranged to be movable in a direction of optical axes AX1 and AX2 with respect to the third frame LB3. The second frame LB2 is arranged to be movable in the direction of the optical axes AX1 and AX2 with respect to the third frames LB3a and LB3b.

Numerical data of each example is shown below. Regarding symbols, r denotes a radius of curvature of each lens surface, d denotes a distance between two lenses, nd denotes a refractive index of each lens for a d-line, and νd denotes Abbe's number for each lens. Moreover, S denotes an aperture stop and FS denotes a flare aperture.

EXAMPLE 1

Unit mm

Surface data

| Surface no. | r | d | nd | vd |
|---|---|---|---|---|
| 1 | ∞ | 0.2500 | 1.88815 | 40.76 |
| 2 | 0.5920 | 0.5700 | | |
| 3 | −4.5711 | 0.8554 | 1.85504 | 23.78 |
| 4 | −3.3786 | 0.1100 | | |
| 5 | ∞ | 0.4000 | 1.49557 | 75.00 |
| 6 | ∞ | 0.1000 | | |
| 7 (S) | ∞ | 0.1016 | | |
| 8 | 7.9475 | 0.7436 | 1.83932 | 37.16 |
| 9 | −1.8802 | 0.3135 | | |
| 10 (FS) | ∞ | 0.0000 | | |
| 11 | 1.3149 | 0.7438 | 1.69979 | 55.53 |
| 12 | −0.8298 | 0.3347 | 1.93429 | 18.90 |
| 13 | −5.6819 | 0.2635 | | |
| 14 | ∞ | 0.5000 | 1.51825 | 64.14 |
| 15 | ∞ | 0.3500 | 1.50700 | 63.26 |
| Image pickup surface | ∞ | | | |

| | |
|---|---|
| Focal length f1 of overall system | 0.4249 |
| Focal length f2 of lenses L4 and L5 | 2.312 |
| Diameter of lenses L2 and L3 | 1 mm |
| Diameter of lenses L4 and L5 | 1.2 mm |
| Lenses L4 and L5 have D-cut shape, and distance ER up to D-cut | 1 mm |
| Flare aperture FS has D-cut shape, and aperture dimeter distance ER up to D-cut | 1 mm, 0.8 mm |
| Parallax | 1 mm |

EXAMPLE 2

Unit mm

Surface data

| Surface no. | r | d | nd | vd |
|---|---|---|---|---|
| 1 | ∞ | 0.2500 | 1.88815 | 40.76 |
| 2 | 0.5920 | 0.5400 | | |
| 3 | −2.6449 | 0.8360 | 1.85504 | 23.78 |
| 4 | −2.8388 | 0.1900 | | |
| 5 | ∞ | 0.4000 | 1.49557 | 75.00 |
| 6 | ∞ | 0.0807 | | |
| 7 (S) | ∞ | 0.1338 | | |
| 8 | 3.6829 | 0.6446 | 1.83932 | 37.16 |
| 9 | −2.2104 | 0.3395 | | |
| 10 | 1.5521 | 0.7800 | 1.69979 | 55.53 |
| 11 | −0.8302 | 0.3523 | 1.93429 | 18.90 |
| 12 | −35.2793 | 0.3040 | | |
| 13 | 1.5026 | 0.5000 | 1.51825 | 64.14 |
| 14 | ∞ | 0.3500 | 1.50700 | 63.26 |
| Image pickup surface | ∞ | | | |

| | |
|---|---|
| Focal length f1 of overall system | 0.41769 |
| Focal length f2 of lenses L4 and L5 | 4.0527 |
| Diameter of lenses L2 and L3 | 1.1 mm |
| Lenses L4 and L5 have D-cut shape, and distance ER up to D-cut | 1 mm |
| Parallax | 1.1 mm |

EXAMPLE 3

Unit mm

Surface data

| Surface no. | r | d | nd | vd |
|---|---|---|---|---|
| 1 | ∞ | 0.2500 | 1.88815 | 40.76 |
| 2 | 0.592 | 0.6331 | | |
| 3 | −0.9641 | 0.4900 | 1.85504 | 23.78 |
| 4 | −1.1345 | 0.3899 | | |
| 5 | 2.11 | 0.3917 | 1.58482 | 40.75 |
| 6 | 12.2107 | 0.3598 | | |
| 7 (S) | ∞ | 0.0610 | | |
| 8 | 22.4495 | 0.5905 | 1.57124 | 56.36 |
| 9 | −1.9442 | 0.0500 | | |
| 10 | ∞ | 0.4000 | 1.49557 | 75.00 |
| 11 | ∞ | 0.0656 | | |
| 12 | 1.3335 | 0.7598 | 1.69979 | 55.53 |
| 13 | −0.8346 | 0.2798 | 1.93429 | 18.90 |
| 14 | −3.6567 | 0.2520 | | |
| 15 | ∞ | 0.5000 | 1.51825 | 64.14 |
| 16 | ∞ | 0.3500 | 1.50700 | 63.26 |
| Image pickup surface | ∞ | | | |

| | |
|---|---|
| Focal length f1 of overall system | 0.426 |
| Focal length f2 of lens L3 | 4.3 |
| Diameter of lenses L2 to L6 | 1 mm |
| Parallax | 1 mm |

Corresponding values for conditional expressions of each example are shown below

| | Example 1 | Example 2 | Example 3 |
|---|---|---|---|
| (1) f2/f1 | 5.44128 | 9.70265 | 10.0939 |

MODIFIED EXAMPLE

Figure 5A:
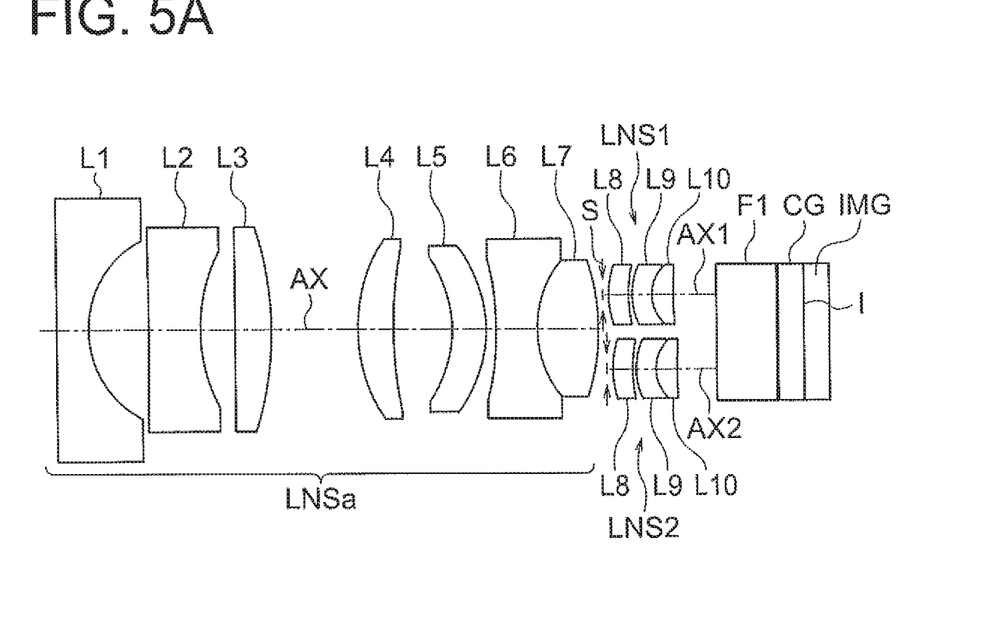
FIG. 5A is a diagram showing a cross-sectional view of a lens arrangement of an image pickup apparatus according to a modified example.

FIG. 5 is a diagram showing a cross-sectional view of a lens arrangement of an image pickup apparatus according to a modified example. The image pickup apparatus according to the modified example includes a common optical system LNSa, a first optical system LNS1, a second optical system LNS2, a plane parallel plate F1, and a plane parallel plate CG.

Moreover, by a frame not shown in the diagram, a lens L9 and lens L10 of the first optical system are arranged to be movable. Accordingly, it is possible to adjust a focusing difference between the first optical system LNS1 and the second optical system LNS2.

Moreover, in the examples described above, it is possible to make a modification such that a prism is disposed on the image side of the lens systems, and the image sensor is disposed horizontally.

Figure 5B:
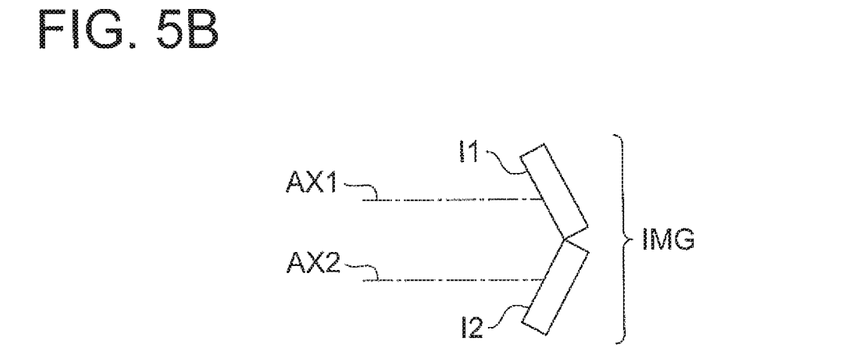
FIG. 5B is a diagram showing a modified example of an image sensor.
Figure 5C:
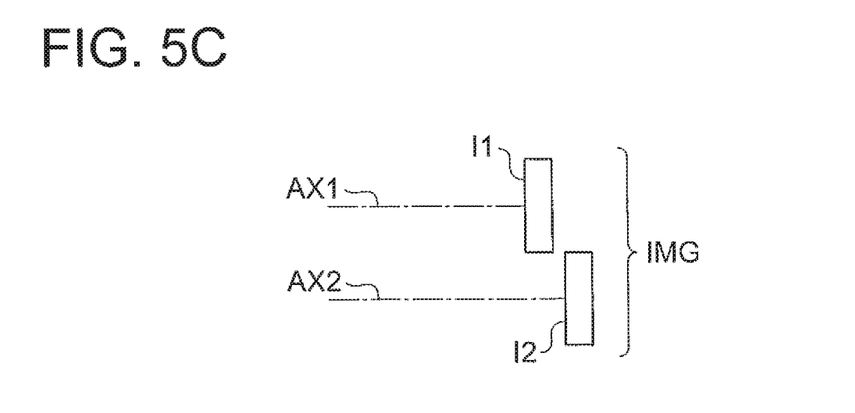
FIG. 5C is a diagram showing other modified example of the image sensor.

Moreover, in each of the examples described above, it is also possible to modify the image sensor. Any modification is in a scope of the application of the present invention provided that it is an image pickup unit in which relative positions of an image pickup surface that captures an image formed by the first optical system and an image pickup surface that captures an image formed by the second optical system are fixed. For instance, as shown in FIG. 5B and FIG. 5C respectively, a modification in which an arrangement is such that image pickup surfaces 11 and 12 are not required to be on the same plane, and are mutually inclined, and shifted in an optical axial direction is possible.

Moreover, the optical systems are not restricted only to fixed-focus optical systems as in each of the examples described above. It is also applicable to a variable magnification optical system and a focus switching optical system. In this case, a lens (focal length f2) used for focus adjustment in each of the examples described above may be selected from lenses other than the lenses to be moved at the time of zooming.

Moreover, an image pickup arrangement in which the number of optical systems is not less than three, and any two arbitrary optical system can be selected is also in the category of the present invention. Moreover, the frames may be divided provided that it does not affect the focus adjustment. For instance, in FIG. 1A, LB3 may be divided into two frames. One of the frames may hold the lens L1 only, and the other frame may hold the remaining optical members. The two frames into which the LB3 has been divided may abut in the optical axial direction, and may be let to be adjustable in a direction perpendicular to the optical axis. Accordingly, it is possible to cancel a decentering error of the lens L1 by adjusting the two frames. Consequently, an effect that such arrangement leads to a cost reduction is shown.

Various embodiments of the present invention are described heretofore. However, the present invention is not restricted to the embodiments described above, and embodiments in which arrangements of the embodiments are combined appropriately without departing from the scope of the present invention are also in the category of the present invention.

As described heretofore, the present invention is useful for an image pickup apparatus which enables to adjust the difference between the focusing positions of the two optical systems, and to achieve favorable parallax images.

The present invention shows an effect that it is possible to provide an image pickup apparatus which enables to adjust a difference in focusing positions of the two optical systems, and to achieve favorable parallax images.

What is claimed is:

1. An image pickup apparatus, comprising:
a first optical system and a second optical system which generate two optical images having mutual parallax;
an image sensor which captures the two optical images;
a first frame which holds a first group of lenses in the first optical system;
a second frame which holds the image sensor; and
a third frame which holds a second group of lenses in the first optical system different than the first group of lenses held by the first frame, and all lenses in the second optical system,
wherein the first frame and the second frame are movable in a direction parallel to an optical axis of the first optical system and an optical axis of the second optical system, with respect to the third frame,
wherein the following conditional expression (1) is satisfied:

$$3 \leq f2/f1 < 12 \quad \ldots \quad (1)$$

where:
f1 denotes a focal length of the overall first optical system, and
f2 denotes a focal length of the first group of lenses held by the first frame.

* * * * *